(12) United States Patent
Savides

(10) Patent No.: US 10,136,686 B2
(45) Date of Patent: Nov. 27, 2018

(54) VEGETABLE GRIP

(71) Applicant: Omni Creations, LLC, Boca Raton, FL (US)

(72) Inventor: Patricia Savides, Boca Raton, FL (US)

(73) Assignee: OMNI CREATIONS, LLC, Boca Raton, FL (US)

( * ) Notice: Subject to any disclaimer, the term of this patent is extended or adjusted under 35 U.S.C. 154(b) by 0 days.

(21) Appl. No.: 15/416,792

(22) Filed: Jan. 26, 2017

(65) Prior Publication Data

US 2017/0215494 A1    Aug. 3, 2017

Related U.S. Application Data

(60) Provisional application No. 62/288,845, filed on Jan. 29, 2016.

(51) Int. Cl.
*A41D 19/015*    (2006.01)
*A41D 13/08*    (2006.01)
*A47J 17/10*    (2006.01)

(52) U.S. Cl.
CPC ............ *A41D 13/087* (2013.01); *A47J 17/10* (2013.01); *A41D 2400/80* (2013.01)

(58) Field of Classification Search
CPC ............ A41D 13/087; A41D 2400/80; A41D 19/015; A41D 19/0082
USPC .............................. 294/25, 219, 5; 2/163, 21
See application file for complete search history.

(56) References Cited

U.S. PATENT DOCUMENTS

| | | | | |
|---|---|---|---|---|
| 342,341 | A | * 5/1886 | Edwards | A61F 13/105 2/21 |
| 1,109,796 | A | 9/1914 | Sills | |
| 1,235,199 | A | * 7/1917 | Gavin | A41D 13/087 15/246 |
| 1,261,706 | A | * 4/1918 | Condley et al. | A61F 13/105 2/21 |
| 1,483,595 | A | 2/1924 | Read | |
| 3,500,477 | A | 3/1970 | Mezaros | |
| 3,728,736 | A | * 4/1973 | Pugh | A41D 13/087 2/21 |
| 4,751,747 | A | * 6/1988 | Banks | A41D 19/01529 2/161.8 |
| 4,763,940 | A | 8/1988 | Held | |
| 5,076,520 | A | 12/1991 | Bro | |
| 5,640,713 | A | * 6/1997 | Ping | A41D 13/087 15/227 |
| 5,770,297 | A | 6/1998 | Grubich | |
| 6,145,128 | A | 11/2000 | Suzuki | |
| 8,539,614 | B2 | 9/2013 | Cote | |

(Continued)

FOREIGN PATENT DOCUMENTS

| | | | | |
|---|---|---|---|---|
| FR | 1369291 | A * | 8/1964 | ........... A41D 13/087 |
| GB | 269830 | A * | 4/1927 | ........... A41D 13/087 |

*Primary Examiner* — Gabriela M Puig
(74) *Attorney, Agent, or Firm* — Duane Morris LLP; Gregory M. Lefkowitz; Jason M. Nolan

(57) ABSTRACT

A device adapted for handling slippery objects, such as peeled vegetables, is disclosed. The device can include a first finger cover; a second finger cover, in which each of the first and second finger covers includes an outer surface defining an inner volume having an open end; a strap coupling a first side of the first finger cover to a first side of the second finger cover; and a gripping surface formed on at least a portion of at least one of the first finger cover or the second finger cover.

18 Claims, 4 Drawing Sheets

(56) References Cited

U.S. PATENT DOCUMENTS

| | | | |
|---|---|---|---|
| 8,887,314 B2 | 11/2014 | Bormann-Early | |
| 8,919,838 B2 | 12/2014 | Zimmerman et al. | |
| 8,943,612 B2 | 2/2015 | Jeong et al. | |
| 9,033,383 B2 | 5/2015 | Rampersad | |
| 2004/0078866 A1* | 4/2004 | Fitz | A61F 13/26 2/163 |
| 2012/0278964 A1* | 11/2012 | Bormann-Early | A41D 13/087 2/21 |
| 2014/0283279 A1* | 9/2014 | Pratho | A41D 13/087 2/163 |
| 2017/0000199 A1* | 1/2017 | Guzman | A41D 13/087 |

\* cited by examiner

VEGETABLE GRIP

CROSS-REFERENCE TO RELATED APPLICATIONS

The present application claims benefit to U.S. Provisional Patent Application No. 62/288,845, filed Jan. 29, 2016, the entirety of which is incorporated herein by reference.

BACKGROUND

Peeling or slicing vegetables often requires the use of device having a sharp metal blade (e.g., a knife, peeler, mandoline, chopper). Generally, a user grips a vegetable with the fingers of one hand and the device with the fingers of the other hand. A variety of other sliding options, such as, food processors, spiral slicers, etc., are also available. However, alternative peeling and slicing options are still desirable.

SUMMARY

In various embodiments, a gripping device is disclosed. The device comprises a first finger cover and a second finger cover. Each of the first and second finger covers comprise an outer surface defining an inner volume having an open end and a closed end. A strap couples a first side of the first finger cover to a first side of the second finger cover. A plurality of gripping features are formed on at least a portion of at least one of the first finger cover and the second finger cover.

In various embodiments, a gripping device comprises first and second finger covers. Each of the first and second finger covers comprise an outer surface defining an inner volume having a first open end. Each of the first and second finger covers comprises a gripping surface disposed on a first side of the respective finger cover. A strap couples the first side of the first finger cover to the first side of the second finger cover such that the first side of the first finger cover and the first side of the second finger cover define a gripping gap or space therebetween.

In various embodiments, a gripping device comprises first and second finger covers. Each of the first and second finger covers comprise an outer surface defining an inner volume having a first open end and a second open end, respectively. Each of the first and second finger covers comprises a gripping surface disposed on a first side of the respective finger cover. The first and second finger covers are formed of a first material and the gripping surface is formed of a second material. The first material and the second material have different coefficients of friction. A strap couples the first side of the first finger cover proximate the first open end to the first side of the second finger cover proximate the second open end such that the first side of the first finger cover and the first side of the second finger cover define an adjustable gripping gap or space therebetween.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
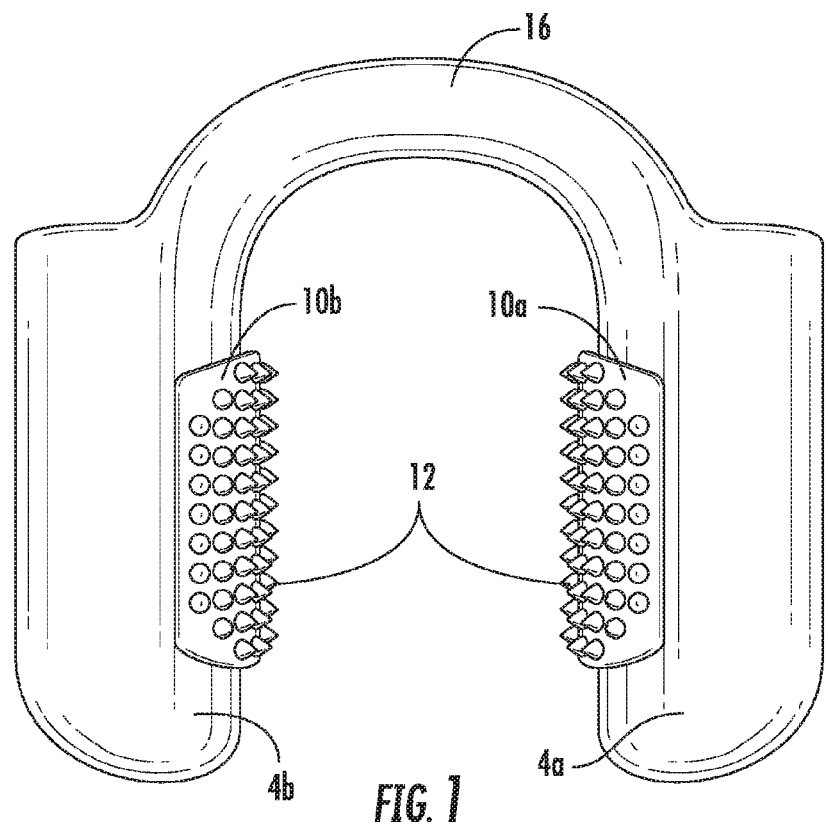
FIG. 1 is a front view of one embodiment of a gripping device, in accordance with some embodiments.
Figure 2:
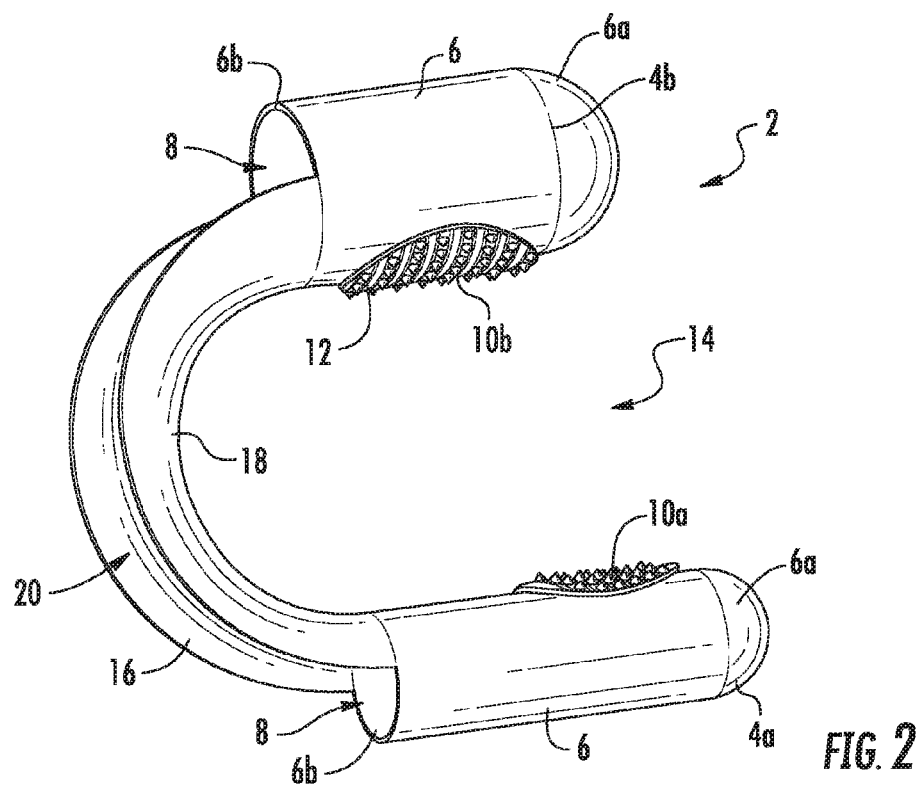
FIG. 2 is a perspective view of one embodiment of a gripping device, in accordance with some embodiments.
Figure 3:
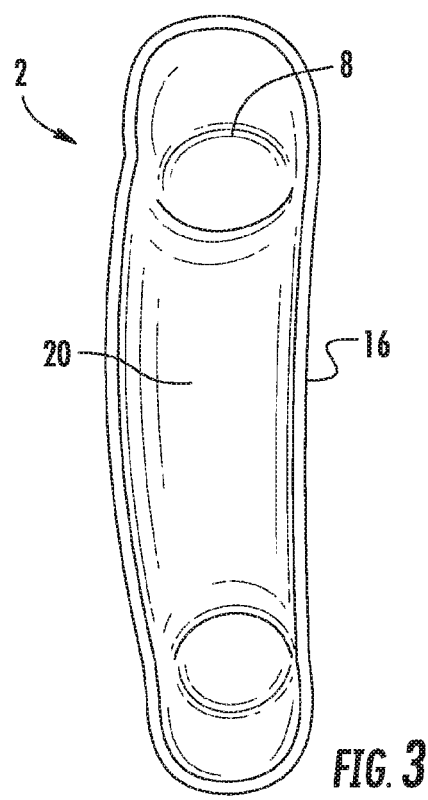
FIG. 3 is a top view of one embodiment of a gripping device, in accordance with some embodiments.
Figure 4:
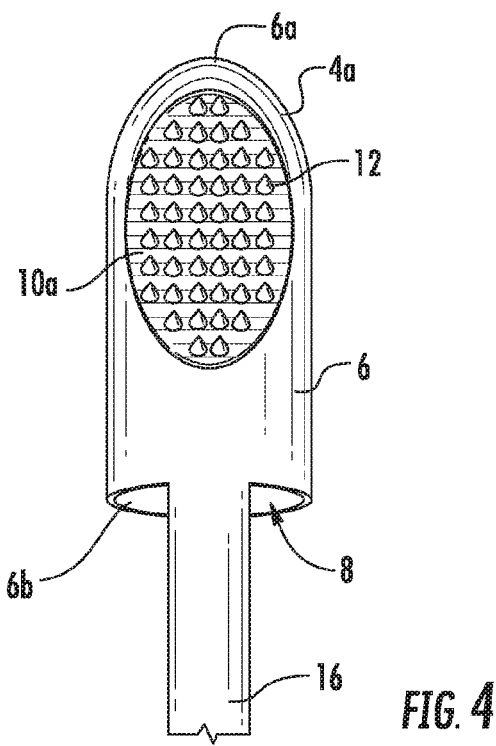
FIG. 4 is a side view of one embodiment of a gripping device that illustrates a gripping surface, in accordance with some embodiments.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

In various embodiments, a gripping device sized and configured to be worn over one or more fingers is disclosed. In some embodiments, the gripping device includes a first finger cover and a second finger cover. The first finger cover is sized and configured to fit at least partially over a first finger, such as, for example, an index finger, a middle finger, a ring finger, and/or a pinky finger. The first finger cover can be sized and configured to fit at least partially over two or more fingers, such as, for example, the index and middle fingers or the middle and ring fingers. The second finger cover is sized and configured to fit at least partially over a second finger, such as, for example, a thumb. The first finger cover is coupled to the second finger cover by a flexible strap. The flexible strap extends from an inside edge of the first finger cover to an inside edge of the second finger cover.

FIGS. 1-7 illustrate one embodiment of a gripping device 2 including a first finger cover 4a and a second finger cover 4b. The first finger cover 4a and the second finger cover 4b each comprise an outer surface 6 defining an inner volume 8. The outer surface 6 defines a closed end 6a and an open end 6b that provides access to the inner volume 8. Each of the inner volumes 8 are sized and configured to receive a finger of a user therein. For example, in some embodiments, the inner volume 8 of the first finger cover 4a is sized and configured to receive an index finger or a long finger therein and the inner volume 8 of the second finger cover 4b is sized and configured to receive a thumb therein. In some embodiments, the inner volume 8 of the first finger cover 4a is sized and configured to receive an index finger and a long finger and the inner volume 8 of the second finger cover 4b is sized and configured to receive a thumb therein.

The finger covers 4a, 4b are configured to extend at least partially over a digit inserted into the inner volume 8. In some embodiments, the first finger cover 4a is adapted so that the proximal interphalangeal joint is exposed (not covered by the first finger cover 4a), but the distal interphalangeal joint is covered by the first finger cover 4a. In some embodiments, the first finger cover 4a is adapted so the that distal interphalangeal joint is exposed (not covered by the first finger cover 4a). In some embodiments, the second finger cover 4b is adapted so that the interphalangeal joint is covered, while in other embodiments the second finger cover 4b is adapted so that the interphalangeal joint is not covered. In some embodiments, one or both of the distal interphalangeal joint and the interphalangeal joint are partially covered by the first finger cover 4a and the second finger cover 4b, respectively.

Figure 5:
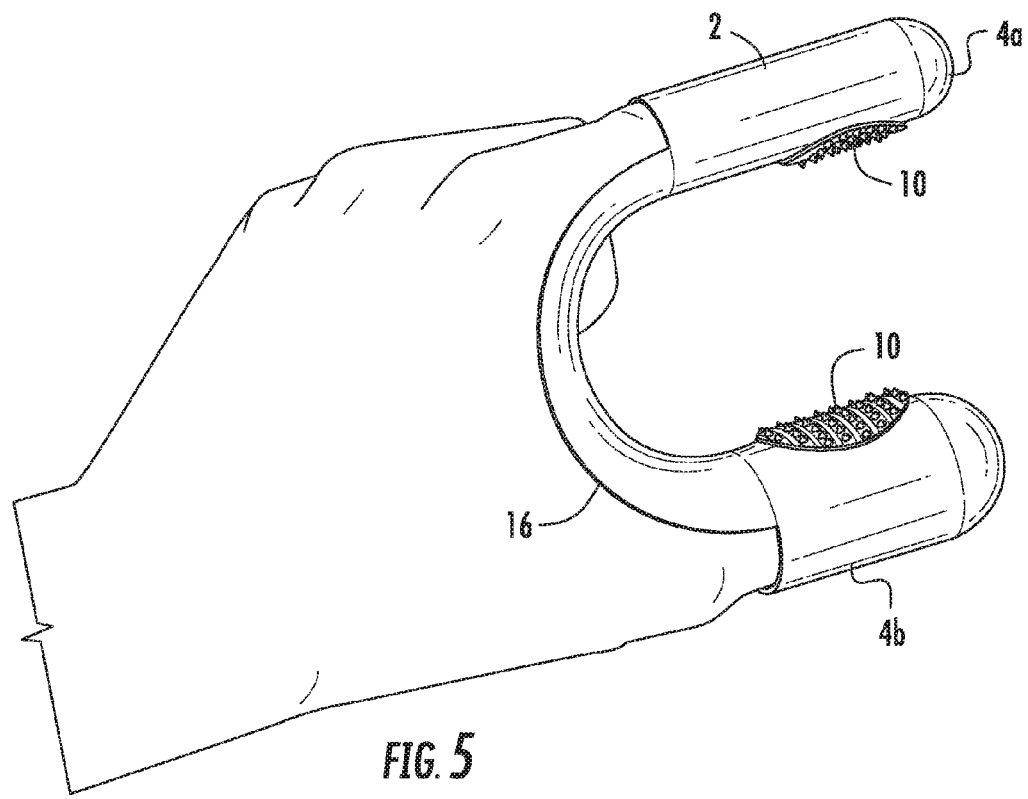
FIG. 5 is a perspective view of one embodiment of a gripping device, with a user wearing the gripping device, in accordance with some embodiments.
Figure 6:
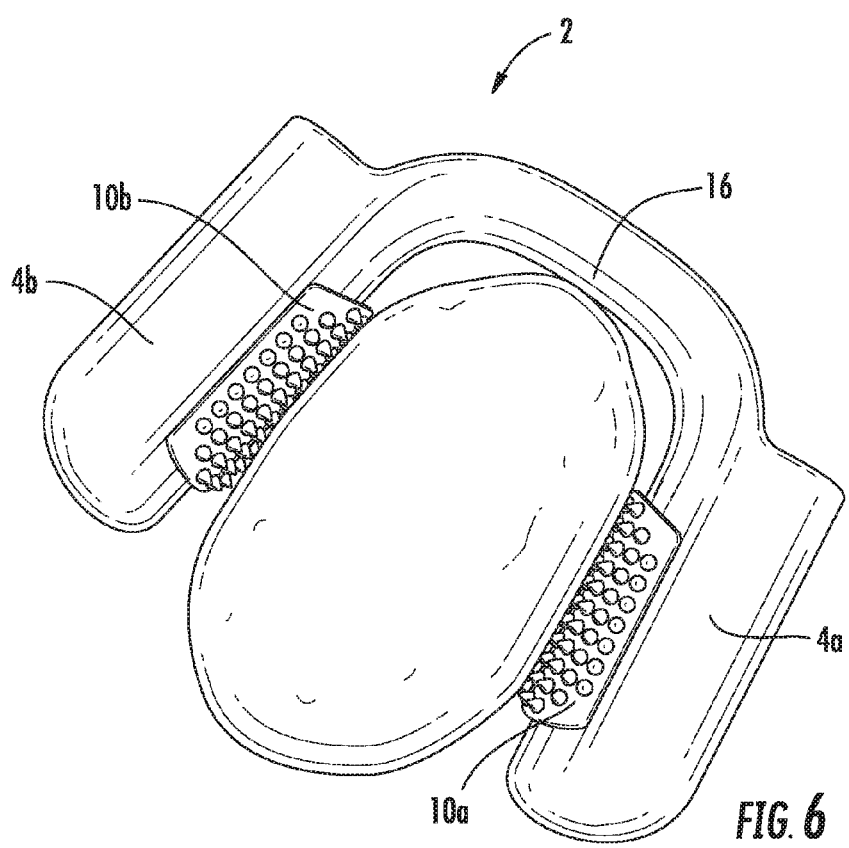
FIG. 6 is a side view of one embodiment of a gripping device, with a vegetable secured by the gripping device, in accordance with some embodiments.

The finger covers 4a, 4b can be any suitable dimensions sized and configured to receive a digit therein (see FIG. 5). For example, in some embodiments, the first finger cover 4a can include an inner diameter of about 20 mm and a length of about 55 mm and the second finger cover 4b can include an inner diameter of about 25 mm and a length of about 55 mm. In other embodiments, the first finger cover 4a and/or the second finger cover 4b can include any suitable length and/or width, such as, for example, a length in the range of 25-80 mm, such as, for example, about 30, about 40 mm, 50 mm, 60 mm, or 70 mm, or 75 mm, a width in the range of about 10-30 mm, such as about 15 mm, 19 mm, 20 mm, or 25 mm, and/or any other suitable length or width. The first and second finger covers 4a, 4b can have the same length and/or can have different lengths. For example, in some embodiments, the first finger cover 4a can include a length of about 50-60 mm and the second finger cover 4b can include a length of about 50-60 mm. Although specific lengths and/or widths are discussed herein, it will be appreciated that the finger covers 4a, 4b can include lengths and/or widths that are larger or smaller than the measurements disclosed herein.

In some embodiments, at least one of the finger covers 4a, 4b includes a gripping surface 10a, 10b (collectively gripping surfaces 10). The gripping surfaces 10 include one or more gripping features 12 configured to provide a secure, non-slip surface for gripping one or more items, such as, for example, a vegetable. The gripping surfaces 10 can include any suitable gripping features 12, such as, for example, a plurality of protrusions, dimples, bumps, and/or any other suitable gripping feature 12. In some embodiments, the gripping surfaces 10 include a plurality of spikes (or spiked protrusions) extending from finger covers 4a, 4b towards a gripping gap 14 defined between the first finger cover 4a and the second finger cover 4b (see FIGS. 1,2, and 4). The gripping surfaces 10 are formed on at least a portion suitable dimensions of the finger covers 4a, 4b. In some embodiments, such as those shown in FIGS. 1,2, and 5-7, the gripping surfaces 10 can be on opposing surfaces of the first and second finger covers 4a, 4b so that they opposing gripping surfaces contact each other when the finger covers 4a, 4b are brought together by a person wearing the gripping device 2.

In some embodiments, the first finger cover 4a and/or the second finger cover 4b are tapered towards the closed end 6a. The finger covers 4a, 4b can taper to a rounded and/or blunt tip. Although embodiments are illustrated herein with closed, tapered ends 6a, it will be appreciated that the first finger cover 4a and/or the second finger cover 4b can include open ends and/or non-tapered ends.

In some embodiments, the first finger cover 4a is coupled to the second finger cover 4b by a flexible strap 16. The flexible strap 16 extends from an inner side of the first finger cover 4a (e.g., a portion of the first finger cover 4a adjacent the gripping gap 14) to an inner side of the second finger cover 4b. In some embodiments, the flexible strap 16 has a predetermined length configured to provide a predetermined maximum spacing between the first gripping surface 10a and the second gripping surface 10b. For example, in some embodiments, the predetermined length of the flexible strap 16 is about 80 mm (e.g., 50-110 mm or 60-100 mm, or 70-90 mm). In some embodiments, the flexible strap 16 has a predetermined width 16, such as, for example, about 20 mm (e.g., 10-30 mm or 15-25 mm).

Figure 7:
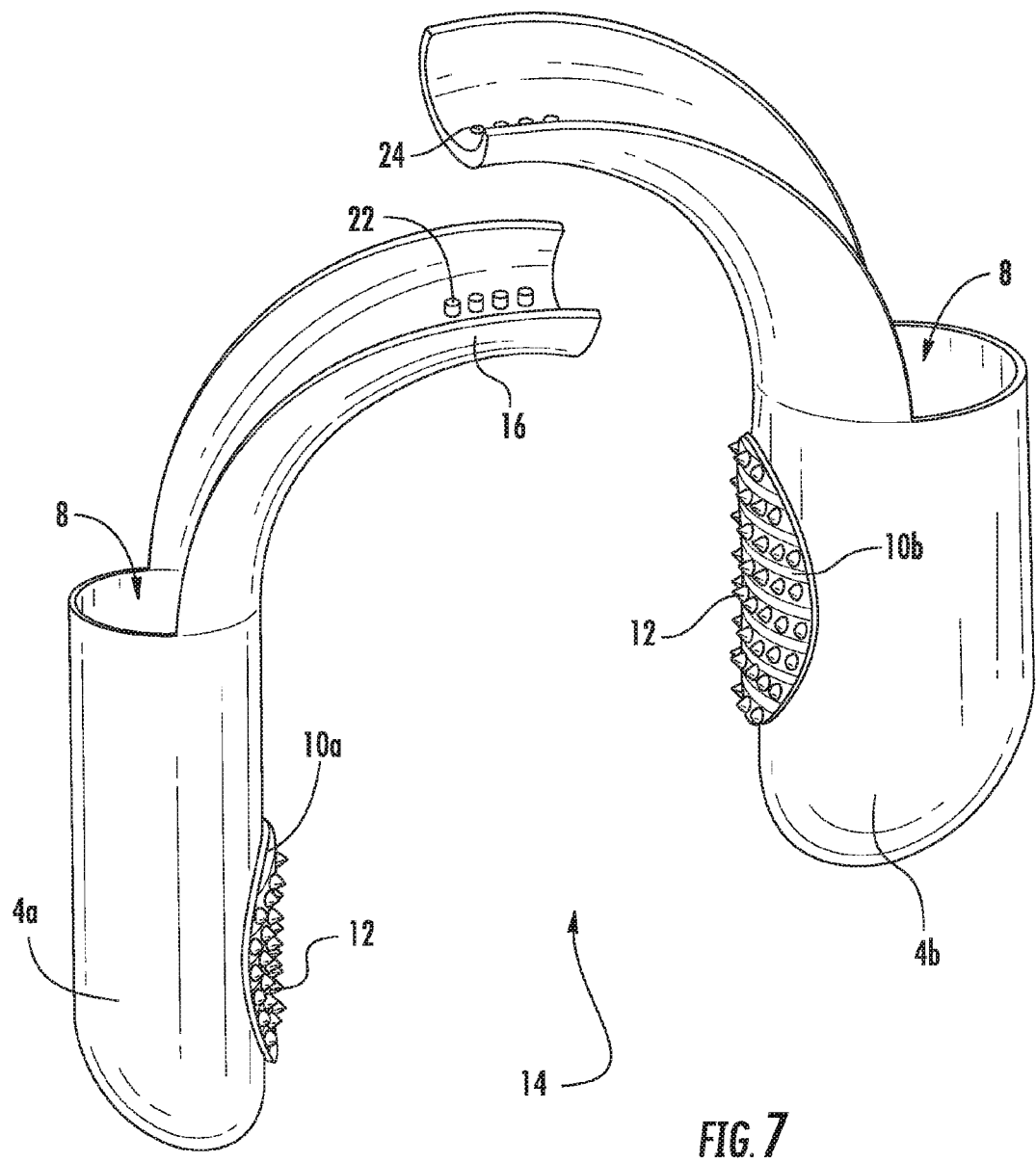
FIG. 7 is a perspective view of one embodiment of a gripping device with an adjustable strap, in accordance with some embodiments.

In some embodiments, the first finger cover 4a, second finger cover 4b, and strap 16 are formed of a unitary piece of material (e.g., an injection molded plastic or elastomeric material). In some embodiments, the first finger cover 4a and a portion of strap 16 and the second finger cover 4b and a portion of strap 16 can be distinct pieces of material. In some embodiments, the portion of the strap 16 that is connected to the first finger cover 4a and the portion of the strap 16 that is connected to the second finger cover 4b are connectable (see FIG. 7). In some embodiments, the portion of the strap 16 that is connected to the first finger cover 4a and the portion of the strap 16 that is connected to the second finger cover 4b are sized and configured to connect by an overlapping and adjustable mechanism that allows the length of strap 16 to be adjustable. For example, in some embodiments, one portion of strap 16 can include multiple holes, slits, or gaps (i.e., a female connector) and the other strap can include a mechanism (i.e., a male connector) by which the overlapping the portions of strap 16 can be connected and adjusted (e.g., a plurality of snaps or a buckle having an assembly that fits into the holes, slits, or gaps) so that the strap can be incrementally adjusted or readjusted for different users or the fingers used. As shown in FIG. 7, in accordance with some embodiments, a portion of strap 16 comprises a plurality of snaps 22 and a portion of strap 16 comprises a plurality of holes 24. As shown in FIG. 7, in accordance with some embodiments, a portion of strap 16 connected to a first finger cover 4a and a portion of strap 16 (e.g., projections) connected to a second finger cover 4b are configured to connect by one or more overlapping snaps 22 and one or more holes 24. Although FIG. 7 illustrates a plurality of snaps 22 (male connector) on the portion of strap 16 connected to the first finger cover 4a and the plurality of holes 24 (female connector) on the portion of strap 16 connected to the second finger cover 4b, it will be appreciated that the snaps 22 (male connector) can be on the portion of strap 16 connected to the second finger cover 4b and the holes 24 (female connector) can be on the portion of strap 16 connected to the first finger cover 4a.

In some embodiments, the flexible strap 16 is sized and configured to at least partially cover the webbing between an index finger and a thumb finger of a user. The flexible strap 16 can include a length and width such that the flexible strap 16 is in contact with a portion of the user's hand (e.g., the webbing between the index finger and thumb) during operation of a gripping device 2. For example, in some embodiments, the flexible strap 16 is sized and configured to be in substantially constant contact with at least part of the webbing between a user's thumb and index/long finger when a user is wearing the gripping device 2 (i.e., have a predetermined width). In other embodiments, the flexible strap 16 is sized and configured to be in contact with a user when the finger covers 4a, 4b are in a predetermined position (e.g., have a predetermined spacing) and/or is configured such that the flexible strap 16 does not contact a user during use. In some embodiments, when viewed facing the open ends 6b, as in FIG. 2, the flexible strap 16 includes a concave and/or convex curved surface 18. The curved surface 18 defines an inner volume 20 for contacting a user, while the overall internal cross-sectional shape between the first and second finger covers 4a, 4b is a concave arc. In some embodiments, the flexible strap 16 includes a predetermined length configured to provide mobility to a user. For example, in some embodiments, the flexible strap 16 includes a predetermined length of about 80 mm.

In some embodiments, the first finger cover 4a and/or the second finger cover 4b comprise a surface 6 defining a cylindrical shape and having an inner volume 8. The cylindrical surface 6 can have a constant diameter and/or can have a variable diameter over the length of the finger cover 4a, 4b. Although the finger covers 4a, 4b are illustrated with a closed end 6a, it will be appreciated that finger covers 4a, 4b can include openings at both ends 6a, 6b of the finger cover 4a, 4b.

The gripping device 2 can comprise any suitable material, such as, for example, a flexible plastic, rubber, and/or composite material. In some embodiments, a first portion of the gripping device 2, such as the finger covers 4a, 4b and/or the flexible strap 16, can comprise a first material and a second portion, such as the gripping features 12, can comprise a second material. In some embodiments, the first material and/or the second material are configured to provide a high coefficient of friction to prevent items held within the gripping gap 14 from moving with respect to the gripping device 2. In some embodiments, the material used to form the gripping surfaces 10a, 10b is stiffer than the material used to form the finger covers 4a, 4b.

In some embodiments, the gripping device comprises: a first finger cover; a second finger cover, wherein each of the first and second finger covers comprise an outer surface defining an inner volume having open end and, optionally, a closed end; a strap coupling a first side of the first finger cover to a first side of the second finger cover; and one or more gripping features formed on at least a portion of at least one of the first finger cover or the second finger cover.

In some embodiments, the plurality of gripping features comprises a plurality of protrusions extending from the outer surface of the first or second finger covers.

In some embodiments, the plurality of protrusions are comprised of spikes.

In some embodiments, the first finger cover has a first length and the second finger cover has a second length. In some embodiments, at least one of the first length or the second length is 25-55 mm. In some embodiments, the first and second length are different. In some embodiments, the first and second length are the same.

In some embodiments, the first finger cover has a first diameter at an open end and the second finger cover has a second diameter at an open end, and wherein the first and second diameters are different. In some embodiments, the first diameter is about 15-25 mm and the second diameter is about 15-30 mm.

In some embodiments, the strap has a length of about 50-110 mm. In some embodiments, the strap is formed of a unitary piece of material. In some embodiments, the strap is formed of distinct pieces of material.

In some embodiments, the strap comprises distinct pieces of material, wherein the pieces of material are connectable and adjustable using a mechanism by which the length of strap can be adjusted.

In some embodiments, the first and second finger portions comprise a first material and the gripping features comprise a second material, and wherein a coefficient of friction of the second material is greater than a coefficient of friction of the first material.

In some embodiments, the gripping device, comprises: first and second finger covers, wherein each of the first and second finger covers comprise an outer surface defining an inner volume having a first open end, and wherein each of the first and second finger covers comprises a gripping surface disposed on a first side of the respective finger cover; and a strap coupling the first side of the first finger cover to the first side of the second finger cover such that the first side of the first finger cover and the first side of the second finger cover define a gripping gap therebetween.

In some embodiments, the plurality of gripping features comprises a plurality of protrusions extending from the outer surface of the first or second finger covers. In some embodiments, the plurality of protrusions comprises spikes.

In some embodiments, the first finger cover has a first length and the second finger cover has a second length. In some embodiments, at least one of the first length or the second length ranges from 25 to 80 mm, or from 35 to 75 mm, or from 40 to 70 mm.

In some embodiments, the first finger cover has a first diameter at an open end and the second finger cover has a second diameter at an open end, and wherein the first and second diameters are different. In some embodiments, the diameter of the first finger cover is about 10 to 35 mm, or 13 to 30 mm, or 15 to 25 mm, or any combination thereof. In some embodiments, the diameter of the second finger cover is about 10 to 40 mm, or 15 to 35 mm, or 20 to 30 mm, or any combination thereof.

In some embodiments, the strap has a length of about 50 to 110 mm.

In some embodiments, the first and second finger portions comprise a first material and the gripping features comprise a second material, and wherein a coefficient of friction of the second material is greater than a coefficient of friction of the first material.

In some embodiments, the gripping device comprises: first and second finger covers, wherein each of the first and second finger covers comprise an outer surface defining an inner volume having a first open end, wherein each of the first and second finger covers comprises a gripping surface disposed on a first side of the respective finger cover, wherein the first and second finger covers are formed of a first material and the gripping surface is formed of a second material, and wherein the first material and the second material have different coefficients of friction; and a strap coupling the first side of the first finger cover to the first side of the second finger cover such that the first side of the first finger cover and the first side of the second finger cover define a gripping gap therebetween.

In some embodiments, the device can be worn on the index finger (first finger cover) and thumb (second finger cover) for us in food preparation. For example, the device can be used when peeling a potato or other slippery vegetables or other foods. When used for peeling a vegetable, the device facilitates gripping the vegetable with the opposing gripping surfaces, and provides some protection against cuts by the potato peeling. The device can also be used to grip vegetables or other foods when using a mandoline or grater. In this instance, the gripping surface facilitate gripping the vegetable, while the finger covers prevent cuts to the fingers. Thus, the device, while simple, provides substantial benefits to the wearer.

Although the subject matter has been described in terms of exemplary embodiments, it is not limited thereto. Rather, the appended claims should be construed broadly, to include other variants and embodiments, which may be made by those skilled in the art.

What is claimed is:

1. A device, comprising:
a first finger cover;
a second finger cover,
wherein each of the first and second finger covers comprise an outer surface defining an inner volume having an open end;
a strap coupling a first side of the first finger cover to a first side of the second finger cover; and
a gripping surface formed on at least a portion of at least one of the first finger cover or the second finger cover;
wherein the first and second finger covers are adapted so that a user's proximal interphalangeal joint is exposed;
wherein a lateral cross section of the strap has a concave shape opening toward a webbing of a user's hand between a thumb and index finger;
wherein, in a resting state, the first finger cover, the strap, and the second finger cover have a U-shape; and
wherein the first and second finger covers comprise a first material and the gripping surface comprises a second material that is stiffer than the first material and adapted to grip a vegetable.

2. The device of claim 1, wherein the gripping surface comprises a plurality of gripping features.

3. The device of claim 2, wherein the plurality of gripping features comprise a plurality of protrusions extending from the outer surface of the first or second finger covers.

4. The device of claim 3, wherein the plurality of protrusions comprise spikes.

5. The device of claim 2, wherein a coefficient of friction of the second material is greater than a coefficient of friction of the first material.

6. The device of claim 1, wherein the first finger cover has a first length and the second finger cover has a second length.

7. The device of claim 6, wherein the first and second length are different.

8. The device of claim 1, wherein the first and second finger covers comprise an outer surface defining an inner volume having a closed end opposite the open end.

9. The device of claim 1, wherein the first finger cover has a first diameter at an open end and the second finger cover has a second diameter at an open end, and wherein the first and second diameters are different.

10. The device of claim 9, wherein the first diameter is about 10-35 mm and the second diameter is about 15-40 mm.

11. The device of claim 1, wherein the strap is formed of a unitary piece of material.

12. A device, comprising:
first and second finger covers, wherein each of the first and second finger covers comprise an outer surface defining an inner volume having an open end and a closed end,
wherein the first finger cover has a first length and the second finger cover has a second length,
wherein the first and second finger covers are adapted so that a user's proximal interphalangeal joint is exposed, and
wherein each of the first and second finger covers comprises a gripping surface adapted to grip a vegetable disposed on a first side of the respective finger cover; and
a strap coupling the first side of the first finger cover to the first side of the second finger cover such that the first side of the first finger cover and the first side of the second finger cover define a gripping gap therebetween;
wherein a lateral cross section of the strap has a concave shape opening toward a webbing of a user's hand between a thumb and index finger; and
wherein, in a resting state, the first finger cover, the strap, and the second finger cover have a U-shape.

13. The device of claim 12, wherein the gripping surface comprises a plurality of gripping features comprising a plurality of protrusions extending from the outer surface of the first or second finger covers.

14. The device of claim 12, wherein the plurality of protrusions comprise spikes.

15. The device of claim 12, wherein the first finger cover has a first diameter at an open end and the second finger cover has a second diameter at an open end, and wherein the first and second diameters are different.

16. The device of claim 15, wherein the first diameter is about 10-35 mm and the second diameter is about 15-40 mm.

17. The device of claim 12, wherein the first and second finger covers comprise a first material and the gripping surface comprise a second material, and wherein a coefficient of friction of the second material is greater than a coefficient of friction of the first material.

18. A gripping device, comprising:
first and second finger covers,
wherein each of the first and second finger covers comprise an outer surface defining an inner volume having an open end,
wherein each of the first and second finger covers comprises a gripping surface disposed on a first side of the respective finger cover,
wherein the first and second finger covers are formed of a first material and the gripping surface is formed of a second material,
wherein the first and second finger covers are adapted so that a user's proximal interphalangeal joint is exposed, and
wherein the first material and the second material have different coefficients of friction; and
a strap coupling the first side of the first finger cover to the first side of the second finger cover such that the first side of the first finger cover and the first side of the second finger cover define a gripping gap therebetween,
wherein the strap is formed of a unitary piece of material;
wherein a lateral cross section of the strap has a concave shape opening toward a webbing of a user's hand between a thumb and index finger; and
wherein, in a resting state, the first finger cover, the strap, and the second finger cover have a U-shape.

* * * * *